Patented Nov. 13, 1945

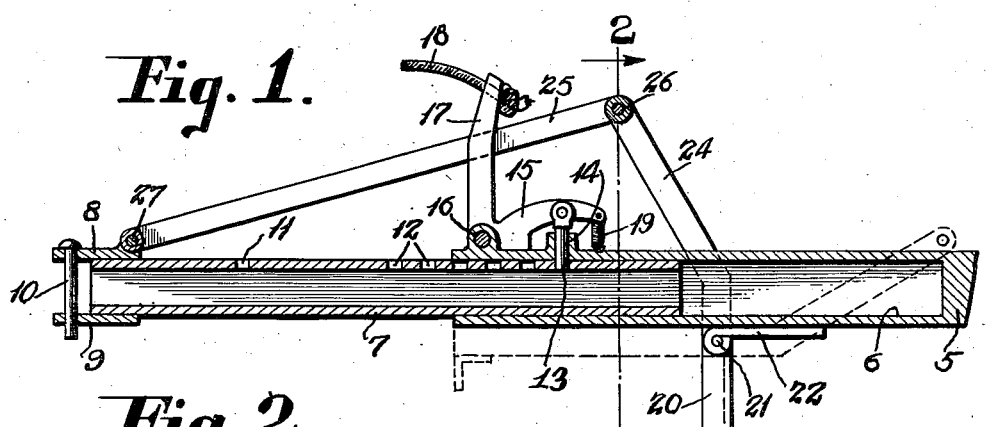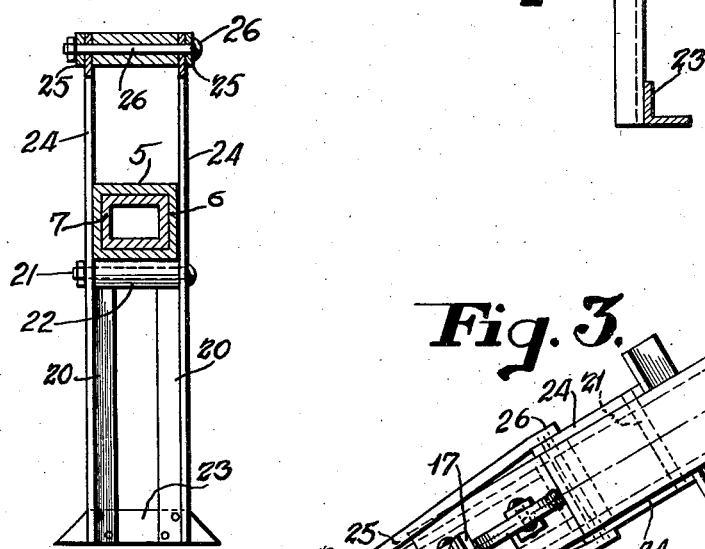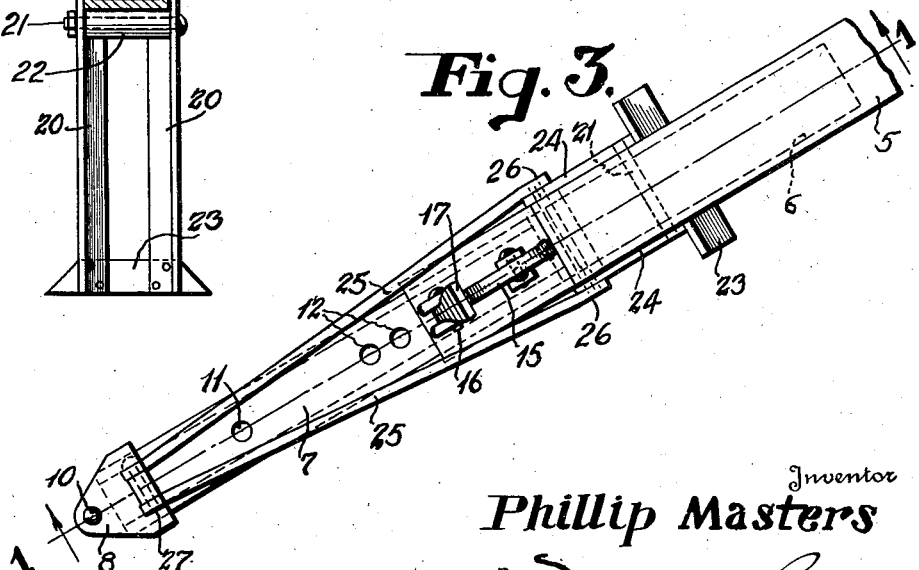

2,388,923

UNITED STATES PATENT OFFICE 2,388,923

RETRACTABLE VEHICLE SUPPORT

Phillip Masters, Broadwater, Nebr.

Application December 27, 1944, Serial No. 569,997

3 Claims. (Cl. 280—33.44)

The present invention relates to new and useful improvements in supports for the tongue of two-wheeled vehicles, such as trailers and other farm implements and the invention has for its primary object to provide a retractable support of this character operable by a pulling and backward movement of the towing vehicle to move the support into and out of its retracted position.

A further object of the invention is to provide latch means operable by the driver of the towing vehicle to secure the support in either its raised or lowered position.

A still further object is to provide a device of this character of simple and practical construction, which is efficient and reliable in operation, strong and durable and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a longitudinal sectional view of the trailer tongue showing the support operatively connected thereto.

Figure 2 is a vertical sectional view taken substantially on a line 2—2 of Figure 1, and Figure 3 is a top plan view.

Referring now to the drawing in detail wherein for the purpose of illustration I have disclosed a preferred embodiment of the invention, the numeral 5 designates a trailer tongue of a type adapted for use with a two-wheeled trailer, or other two-wheeled vehicle, the tongue preferably being of square shape in cross section and having a longitudinally extending chamber 6 in its front end and in which a tongue extension 7 is slidably mounted.

The front or outer end of the extension 7 is provided with upper and lower plates 8 and 9 suitably secured thereto for receiving a coupling pin 10 and by means of which a towing vehicle may be attached to the tongue through the use of any suitable coupling or trailer hitch.

An opening or recess 11 is formed in the upper portion of the front end of the extension 7 and a plurality of longitudinally spaced openings 12 are formed in the upper portion of the rear end of the extension 7.

The openings 11 and 12 are adapted to receive a latch pin 13 slidably mounted in an opening 14 in the top of the front portion of the tongue 5, the pin being pivotally attached adjacent the rear end of a bellcrank latch 15 pivoted intermediate its ends on a pin 16 carried by the tongue 5 and having an upstanding end 17 to which a latch cord or cable 18 is attached and extends forwardly for operation by the driver of the towing vehicle.

To the rear end of the latch 15 is attached a coil spring 19 exerting a downward pulling force on the latch to cause the insertion of the pin 13 in the openings 11 or 12 in accordance with the posion of the extension 7 in the chamber 6 of the tongue.

A pair of supporting legs 20 are positioned at opposite sides of the tongue 5 and the legs are pivoted intermediate their ends on a pin 21 secured to the underside of the tongue by a plate 22. The lower ends of the legs 20 are connected by a horizontal foot 23 preferably of angle iron construction and extending transversely beneath the tongue.

The upper ends of the legs 20 are preferably inclined forwardly as indicated at 24 and to the upper ends thereof are pivotally attached the rear ends of arms 25 by means of a cross pin 26. The front ends of the arms 25 are connected to the upper plate 8 by means of a pin 27.

In the operation of the device the tongue 5 and extension 7 are normally supported by the trailer hitch to which the tongue is attached to a towing vehicle and by releasing the latch pin 13 and backing the towing vehicle to cause an inward telescoping movement of the extension 7 in the chamber 6 of the tongue the arms 25 will swing the upper ends of the legs 20 rearwardly into the dotted line position as shown in Figure 1 of the drawing whereby the legs will be retracted and the latch pin then dropped into the opening 11, and the extension 7 will then be connected to the tongue 5 with the supporting legs 20 retracted and the trailer to which the tongue 5 is attached will then be free to move over the ground.

When it is desired to disconnect the tongue 5 from the towing vehicle the latch pin 13 is pulled upwardly by the latch cord 18 and the towing vehicle moved forwardly to slide the extension 7 outwardly of the tongue 5 whereby the arms 25 will lower the legs 20 into a position for engaging the ground and thus support the tongue 5 and the latch pin 13 is then again dropped into one of the openings 12 according to the height of the draw bar or coupling. That is to say, it is obvious that, if the tongue end portion 5 is at a heighth above the ground or floor, as shown in Figure 1, the legs 20 will assume the vertical position indicated, but, if the tongue end portion be in one of several lower positions, the pin 13 will be engaged in one of the apertures 12 ahead of the last aperture of the series and the legs 20 will, accordingly, be set at an inclination instead of at right angles to the tongue end portion as shown. The towing vehicle may then be detached from the extension 7 and the tongue 5 will be supported in its raised position by the legs 20.

It is believed that the details of construction, manner of operation and advantages of the device will be readily understood from the foregoing without further detailed explanation.

Having thus described the invention, what I claim is:

1. A tongue support for a trailer vehicle and comprising a member slidably carried by the tongue and providing a connection between the tongue and a towing vehicle, a pivoted supporting member attached to the tongue with its lower end adapted to rest on the ground, means connecting the supporting member to said sliding member for raising and lowering the former upon a sliding movement of the latter, and latch means operable from the towing vehicle to releasably connect the sliding member to the tongue.

2. A tongue support for a trailer vehicle and comprising an extension having telescoping engagement with the tongue, said extension having a forward and a rear opening therein and said extension being adapted for attaching to a towing vehicle, a leg pivoted to the tongue with one end adapted for resting on the ground, an arm connecting the other end of the leg to the extension and adapted to raise and lower the leg upon an inward and outward movement of the extension on the tongue, and means releasably engaged in said openings for securing the extension in a forward or rearward position.

3. A tongue support for a trailer vehicle and comprising an extension having telescoping engagement with the tongue, said extension having a forward and a rear opening therein and said extension being adapted for attaching to a towing vehicle, a leg pivoted to the tongue with one end adapted for resting on the ground, an arm connecting the other end of the leg to the extension and adapted to raise and lower the leg upon an inward and outward movement of the extension on the tongue, and a latch pin operable from the towing vehicle and adapted for selective engagement in said openings to secure the extension in either its forward or rearward position.

PHILLIP MASTERS.